United States Patent
Blach et al.

(10) Patent No.: US 6,190,031 B1
(45) Date of Patent: Feb. 20, 2001

(54) MACHINE FOR CONTINUOUS PROCESSING OF FLOWABLE MATERIALS HAVING A HOUSING JACKET DIVIDED INTO LONG AND SHORT SEGMENTS

(76) Inventors: Josef A. Blach; Michael Blach; Markus Blach, all of Hoher Steg 10 D-74348, Lauffen (DE)

( * ) Notice: Under 35 U.S.C. 154(b), the term of this patent shall be extended for 0 days.

(21) Appl. No.: 09/220,168

(22) Filed: Dec. 23, 1998

(30) Foreign Application Priority Data

Oct. 13, 1998 (DE) ............................................. 198 47 103

(51) Int. Cl.$^7$ .............................. B29B 7/48; B29B 7/84
(52) U.S. Cl. ............................. 366/75; 366/76.3; 366/85
(58) Field of Search ...................... 366/76.3, 75, 83–85, 366/144, 155.1, 156.1, 297–301; 425/203, 204, 208, 209; 422/225, 229

(56) References Cited

U.S. PATENT DOCUMENTS

| | | | |
|---|---|---|---|
| 1,356,296 | * | 10/1920 | Casse . |
| 2,942,294 | * | 6/1960 | Reifenhauser . |
| 3,310,837 | * | 3/1967 | Wittrock . |
| 3,640,669 | * | 2/1972 | Hanslik . |
| 3,929,322 | * | 12/1975 | Hanslik . |
| 4,176,967 | * | 12/1979 | Brinkmann et al. ................ 366/83 |
| 4,581,264 | | 4/1986 | Emery et al. . |
| 4,591,487 | * | 5/1986 | Fritsch ............................... 422/229 |
| 4,686,088 | * | 8/1987 | Fritsch ............................... 422/229 |
| 4,773,654 | * | 9/1988 | Fritsch ................................. 366/84 |
| 4,889,430 | * | 12/1989 | Mueller ................................ 366/85 |
| 5,020,916 | * | 6/1991 | Fritsch ............................... 366/144 |
| 5,106,198 | * | 4/1992 | Muller .................................. 366/75 |
| 5,108,711 | * | 4/1992 | Chszaniecki ....................... 425/204 |
| 5,393,140 | | 2/1995 | Blach . |
| 5,462,426 | | 10/1995 | Imamura . |
| 5,476,319 | * | 12/1995 | Blach .................................. 366/83 |
| 5,836,682 | * | 11/1998 | Blach .................................. 366/84 |

FOREIGN PATENT DOCUMENTS

| | | |
|---|---|---|
| 1 595 735 | 8/1969 | (DE) . |
| 42 31 232 | 8/1993 | (DE) . |
| 196 07 666 | 7/1997 | (DE) . |
| 196 07 663 | 9/1997 | (DE) . |
| 0 422 272 | 4/1991 | (EP) . |
| 635343 * | 1/1995 | (EP) . |
| 0 788 867 | 8/1997 | (EP) . |
| 2175513 * | 12/1986 | (GB) .................................. 366/85 |
| WO 97/31767 | 9/1997 | (WO) . |

* cited by examiner

*Primary Examiner*—Charles E. Cooley
(74) *Attorney, Agent, or Firm*—Flynn, Thiel, Boutell & Tanis, P.C.

(57) ABSTRACT

A machine for continuous processing of flowable materials has a plurality of axis-parallel shafts in a space in a housing along a circle. Each shaft includes shaft bearing processing elements which tightly intermesh adjacent shafts. Between a material inlet at one end of the housing and a material outlet at the other end thereof, the housing jacket is divided radially into short segments with further passages and long segments, the length of the long segments being smaller than the outside distance thereof.

20 Claims, 2 Drawing Sheets

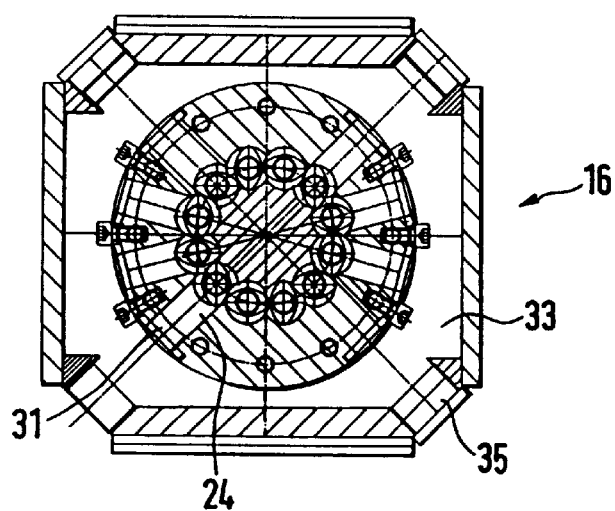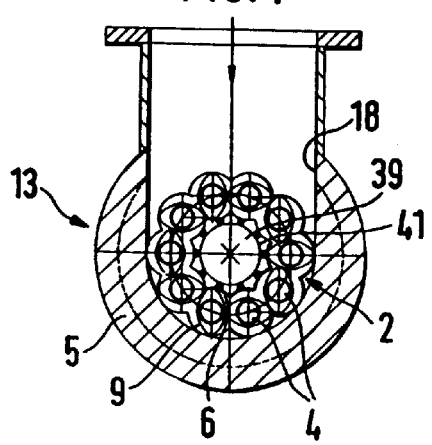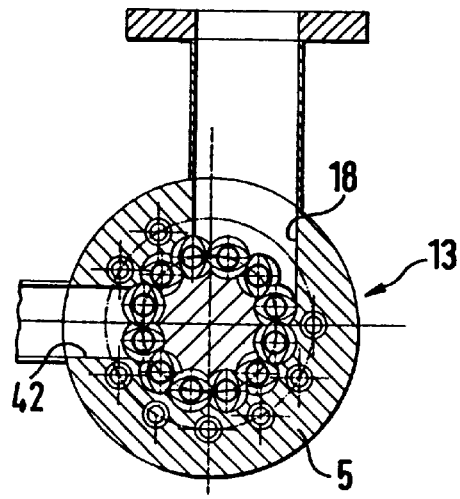

MACHINE FOR CONTINUOUS PROCESSING OF FLOWABLE MATERIALS HAVING A HOUSING JACKET DIVIDED INTO LONG AND SHORT SEGMENTS

FIELD OF THE INVENTION

This invention relates to a machine for continuous processing of flowable materials.

BACKGROUND OF THE INVENTION

A machine for continuous processing of flowable materials is known e.g. from EP 0 788 867 A1. The housing wall consists for example of two about equally long segments, one segment being provided with the material inlet and the other segment with the other passages through which gases are sucked out of the material to be processed subsequent to a kneading and retaining zone.

The processing elements must engage the semicircular channels in the inside core and in the housing wall largely tightly. On the other hand, the housing is exposed to high wear. The two segments produced at high expense must thus be replaced quite frequently.

The problem of the invention is to substantially reduce the costs of such a machine caused by replacement of the segments.

This is attained according to the invention by Applicants' machine.

SUMMARY OF THE INVENTION

As has been ascertained, the wear of the housing is different in the machine in the axial direction, i.e. compared with the rest of the housing wall, mainly where the passages are located for supplying or removing substances.

For example, high wear occurs in the area of passages for supplying solid additives to the material to be processed in the machine, for example reinforcing fibers in the form of rovings. The wear in the area of the passages can also be comparatively low, however, e.g. if the passages are used for sucking off gases or for supplying substances with lubricating properties.

By reason of this different wear of the housing wall in the area of the passages, short segments provided with these passages are used according to the invention while the other segments of the housing wall are of longer design but not longer than the outer diameter of the housing or the largest part of the housing and thus the long segments.

The wear of the housing wall can in addition be dependent on the processing elements. Thus, such a machine can have one or more kneading zones and/or retaining zones between the material inlet and the material outlet. The positively conveying worm elements as processing elements are then replaced in the kneading zone for example by kneading blocks, as known e.g. from EP 0 422 272 A1, and in the retaining zone for example by baffle plates or negatively conveying worm elements.

According to the invention, the segments subject to lower wear thus need to be replaced less often than the segments exposed to high wear. This substantially reduces the operating expenses of the machine.

Taking as a basis the diameter of the bores for receiving the shafts with the processing elements, the length of the long segments is preferably three to seven times, in particular about five times, this diameter, and the length of the short segments one to three times, in particular about two times, this diameter.

Since their strength can be weakened by the passages, the short segments preferably have a larger wall thickness than the long segments. The wall thickness of the long segments can be for example one to three times, in particular about two times, the diameter of the bores for receiving the shafts with the processing elements. In addition, the long segments can be provided on their outside circumference with at least one ring groove for receiving a heater or heat sink.

The passages in the short segments are preferably formed at least partly by larger openings having a diameter which is at least half as large as the diameter of the bores for receiving the shafts with the processing elements.

The long segments are either completely closed or provided at most with small openings with less than one half, in particular less than one fourth, of the diameter of the bores for receiving the shafts with the processing elements. The small bores in the long segments can be used for example for temperature measurement, for sampling or for supplying viscous substances.

If the material to be processed is a solid material which is plasticized in the machine, for example thermoplastic pellets of plastic, the passages can be used for example for sucking gases out of the plasticized material or for supplying additives to the plasticized material. These additives can be for example reinforcing materials, such as reinforcing fibers, which can be supplied e.g. in the form of rovings.

For supplying such solid additives one might require passages which are larger than the passages for discharging gases. Thus, the passages for discharging gases can for example correspond to or be smaller than the diameter of the bores for receiving the shafts with the processing elements while the passages for supplying solid additives can be larger than the diameter of the bores for receiving the shafts with the processing elements.

Accordingly, it is also possible according to the invention to divide the short segments into ones having at least one passage with a diameter larger than the diameter of the bores for receiving the shafts with the processing elements, and ones having exclusively passages with a diameter corresponding at most to the diameter of the bores for receiving the shafts with the processing elements. The short segments with at least one such large passage whose diameter is larger than the diameter of the bores for receiving the shafts with the processing elements can be equally long as or longer than the other short segments.

Besides the short and long segments the housing has a filling segment provided with the material inlet. The filling segment is preferably provided with an opening for discharging gas from the space with the shafts. After entering this space through the material inlet, the material to be processed is conveyed back and forth between adjacent shafts between the outer side and the inner side of the space. If the material to be processed is a powder, the gas component of the powder is thereby separated from the solid. The gas component can thus be sucked off through the gas outlet.

The inventive machine accordingly also permits processing of e.g. very finely powdered substances which can otherwise not be processed with such a machine because the high air component leads to problems in the machine.

The gas outlet can be provided in the filling segment or, if the inside core has a hollow design, by an opening leading from the space with the shafts into the hollow inside core.

BRIEF DESCRIPTION OF THE DRAWINGS

An embodiment of the inventive machine will be explained in more detail below with reference to the enclosed drawing, in which:

FIGS. 2 and 3 show cross sections along line II—II and III—III in FIG. 1;

FIG. 4 shows a cross section along line IV—IV through the filling segment in FIG. 1; and FIG. 5 shows a cross section in accordance with FIG. 4 but of a different embodiment of the filling segment.

DETAILED DESCRIPTION OF THE INVENTION

Figure 1:
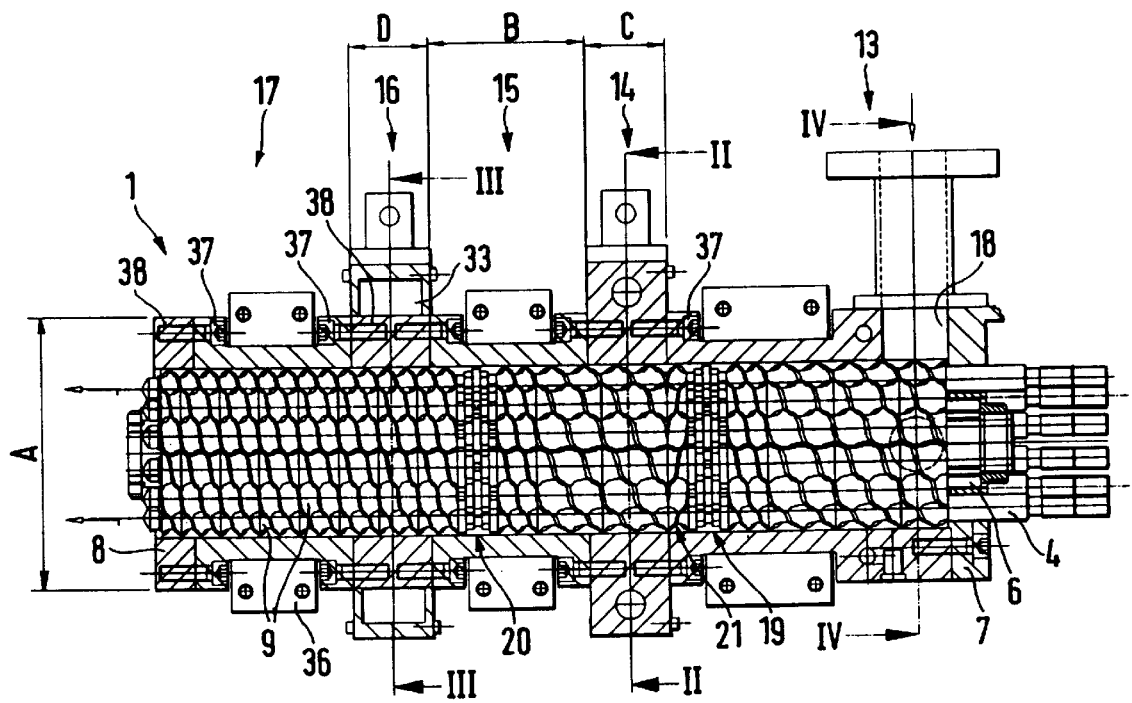
FIG. 1 shows a longitudinal section through the machine.
Figure 2:
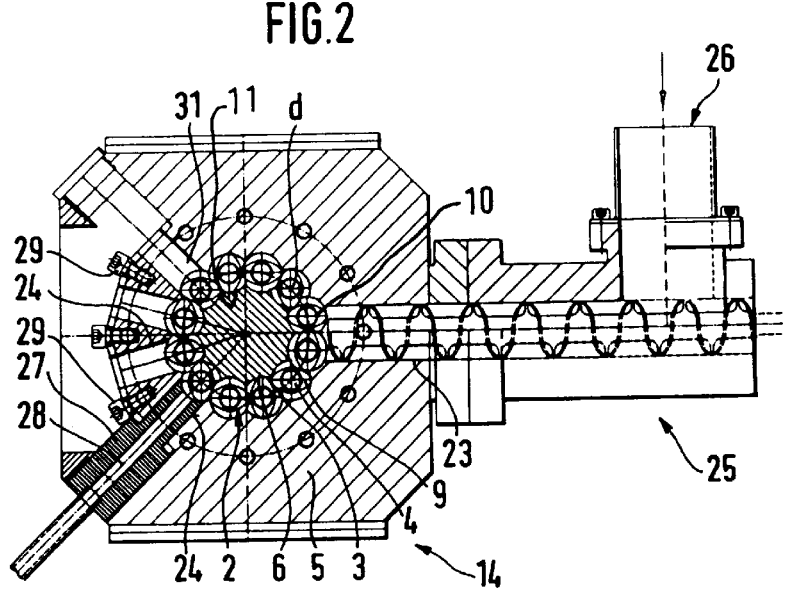

According to FIGS. 1 to 3 the machine has in housing 1 space 2 extending along dividing circle 3 (FIG. 2). In space 2 there are a plurality of axis-parallel shafts 4. Space 2 extends between axial inside core 6 and housing jacket 5 coaxial therewith.

Housing 1 is closed on its faces by end plates 7, 8. Shafts 4 extending through plate 7 are driven in the same direction by a drive not shown. Plate 8 can for example have fastened thereto an extruder head (not shown) with the material outlet.

Disposed on each shaft 4 are a plurality of positively conveying processing elements 9 formed as worm elements. As indicated by FIGS. 2 to 3, worm elements 9 of adjacent shafts 4 intermesh with little play, i.e. largely tightly.

Housing jacket 5 is provided on the inner side, and core 6 on its outer side, with axis-parallel semicircular depressions or channels 10, 11, so as to form circular bores with diameter d. The centers of these bores are located on dividing circle 3. Channels 10 and 11 are engaged by processing elements 9 with little play, i.e. largely tightly.

Housing jacket 5 is formed from end plate 7 to end plate 8 by radial division by filling segment 13, first short segment 14, first long segment 15, second short segment 16 and second long segment 17.

Filling segment 13 is provided on the upper side with inlet 18 through which the material to be processed (not shown) is supplied to space 2 with shafts 4.

According to FIG. 4, the side surfaces of inlet 18 extend tangentially to circular-arc space 2 so that inlet 18 forms a U-shaped space in cross section with space 2.

Between material inlet 18 and the material outlet (not shown) at the other end of housing 1 there is one kneading zone 19, 20 in space 2 at a distance from inlet 18 in filling segment 13 and in first long segment 15 in each case, and retaining zone 21 subsequent to kneading zone 19. In the area of kneading zone 19, 20 worm elements 9 are replaced by kneading blocks, as known for example from EP 0 422 272 A1, and in retaining zone 21 by negatively conveying, and thus retaining, worm elements or optionally baffle plates.

Long segments 15, 17 have length B and short segments 14, 16 lengths C and D, respectively. Length B of long segments 15, 17 is smaller than outer diameter A of housing jacket 5 in the area of long segments 15, 17 or end plates 7, 8. If long segments 15, 17 or end plates 7, 8 have an angular out-side circumference, A is the distance between the two closest opposite sides. Distance A is thus the distance between the closest opposite sides of the outside contour of long segments 15, 17 or end plates 7, 8.

Based on diameter d of the bores in space 2, length B of long segments 15, 17 can be for example three to four times diameter d, and length C or D of short segments 14, 16 one to three times diameter d.

According to FIGS. 2 and 3, a plurality of passages 23, 24 in the form of radial bores opening into space 2 are provided in each of short segments 14, 16.

First short segment 14 has a bore or passage 23 with a diameter larger than diameter d, and further a plurality of smaller bores or passages 24 with a diameter corresponding to diameter d.

Via large passage 23 worm conveyor 25 supplies solid additives, for example glass fibers in the form of short fibers, which are added via inlet 26. In one of passages 24 body 27 with small-diameter bore 28 is fastened with screw 29. The other passages 24 are sealed by filling pieces 31 fastened with screws 29. Screws 29 can be screwed with their heads against body 27 or flanges on filling pieces 31. Via bore 28 in body 27 one can supply liquid substances, for example water, plasticizers, reaction substances or wetting agents.

Passages 24 sealed by filling pieces 31 can be used for sucking off volatile substances in case of need. The same applies to passages 24 in second short segment 16, which, like short segment 14, has a substantially angular outside circumference. In short segment 16 there is a ring channel 33 which connects passages 24 with openings 35 on the edges which can be sealed by filling pieces 31.

First short segment 14 with large passage 23 can have length C which corresponds to or is larger than length D of second short segment 16.

First short segment 14 is of massive design, apart from the area of radial passages 24, i.e. it has a greater wall thickness than long segments 15, 17.

Short segments 14, 16 are located outside the area of kneading zones 19, 20 and retaining zone 21.

Filling segment 13 and long segments 15, 17 are in each case provided on the outside circumference with a ring groove in each of which heater 36 is disposed or optionally a heat sink.

Through the ring grooves flanges are formed on long segments 15, 17. In order to interconnect alternating short and long segments 14 to 17, holes are provided in the flanges of long segments 15, 17 through which screws 37 are inserted which are screwed into threaded holes 38 in short segments 14, 16. Similarly, end plate 8 is fastened to the facing flange of adjacent long segment 17 while first short segment 14 is fastened to filling segment 13 likewise by screws 37 inserted through holes in the adjacent flange of filling segment 13.

To permit air or other gases to be sucked out of a powdery material supplied to the machine via material inlet 18, inside core 6 has, according to FIG. 4, axial bore 39 as well as radial bores 41 from space 2 into axial bore 39 to which gas suction means (not shown) are connected.

Instead, according to the variant shown in FIG. 5, filling segment 13 can be provided with gas outlet 42 offset at an angle from material inlet 18 in order to suck gas out of the powdery material.

What is claimed is:

1. A machine for continuous processing of flowable materials having a plurality of axis-parallel shafts disposed along a circle in a space in a housing between a housing jacket and an inside core, each shaft bearing a plurality of processing elements disposed axially one behind the other with which adjacent shafts intermesh tightly, the housing jacket and the inside core being provided with axis-parallel channels so as to form circular bores which receive and guide each shaft and the plurality of the processing elements supported on the shaft, at least one material inlet to the space with the shafts being provided in the housing jacket at one end of the housing, one material outlet out of the space with the shafts at the other end of the housing, and passages to the space with the shafts in the housing jacket between the material inlet and the material outlet, and the housing jacket being divided into axial segments, wherein the housing jacket is divided between the material inlet and the material outlet into at least one short segment with at least one of the passages and into long segments, the length of the long segments being smaller than the outside distance of the long segments and greater than the length of the at least one short segment.

2. The machine of claim 1, wherein the length of the long segments is three to seven times the diameter of the bores for receiving the shafts with the processing elements, and the length of the at least one short segment is one to three times the diameter of the bores.

3. The machine of claim 1, wherein the at least one passage in the at least one short segment has a diameter at least half as large as the diameter of the bores for receiving the shafts with the processing elements.

4. The machine of claim 1, wherein the at least one short segment is provided with at least one of the passages having a diameter which is larger than the diameter of the bores for receiving the shafts with the processing elements.

5. The machine of claim 4, wherein the short segment with a large one of the passages has a length which is equal to or greater than the length of an additional short segment or segments.

6. The machine of claim 5, wherein the large passage is formed for supplying solid additives.

7. The machine of claim 1, wherein the at least one passage in the short segment is formed for at least one of supplying additives and discharging gases.

8. The machine of claim 1, wherein the passages are capable of being sealed by filling pieces.

9. The machine of claim 1, wherein at least some of the segments have heating or cooling means.

10. The machine of claim 9, wherein the long segments have a ring groove for receiving a heater or heat sink.

11. The machine of claim 1, wherein the processing elements are formed by worm elements, and at least one kneading zone where the worm elements are replaced by kneading blocks is provided between the material inlet and the material outlet.

12. The machine of claim 11, wherein the short segments are disposed outside the kneading zones.

13. The machine of claim 1, wherein a filling segment having the material inlet is provided.

14. The machine of claim 13, wherein the filling segment is provided with a gas outlet.

15. The machine of claim 13, wherein, for discharging gas from the space with the shafts, the inside core is of hollow design and gas outlets from the space with the shafts into the hollow inside core are provided at least in the area of the material inlet.

16. The machine claim 1, wherein the at least one short segment has a greater wall thickness than the long segments.

17. A machine for continuous processing of flowable materials having a plurality of axis-parallel shafts disposed along a circle in a space in a housing between a housing jacket and an inside core, each shaft bearing a plurality of processing elements disposed axially one behind the other with which adjacent shafts intermesh tightly, the housing jacket and the inside core being provided with axis-parallel channels so as to form circular bores which receive and guide each shaft and the plurality of the processing elements supported on the shaft, at least one material inlet to the space with the shafts being provided in the housing jacket at one end of the housing, one material outlet out of the space with the shafts at the other end of the housing, and passages to the space with the shafts in the housing jacket between the material inlet and the material outlet, and the housing jacket being divided into axial segments, wherein the housing jacket is divided between the material inlet and the material outlet into at least one short segment with at least one of the passages and into long segments, the length of the long segments being greater than the length of the at least one short segment, and the at least one short segment having a greater wall thickness than the long segments.

18. The machine of claim 17, wherein the at least one passage in the at least one short segment has a diameter at least half as large as the diameter of the bores for receiving the shafts with the processing elements.

19. The machine of claim 17, wherein the at least one passage in the short segment is formed for at least one of supplying additives and discharging gases.

20. The machine of claim 17, wherein the at least one short segment is provided with at least one of the passages having a diameter which is larger than the diameter of the bores for receiving the shafts with the processing elements.

* * * * *